(12) United States Patent
Coulson

(10) Patent No.: US 6,183,036 B1
(45) Date of Patent: Feb. 6, 2001

(54) CONVERTIBLE LOAD COVER FOR TRUCKS AND TRAILERS

(76) Inventor: David A. Coulson, P.O. Box 30094, Spokane, WA (US) 99223

(*) Notice: Under 35 U.S.C. 154(b), the term of this patent shall be extended for 0 days.

(21) Appl. No.: 09/208,956

(22) Filed: Dec. 8, 1998

(51) Int. Cl.[7] ........................................ B06P 7/02
(52) U.S. Cl. .................... 296/100.13; 296/100.15; 296/105; 296/181
(58) Field of Search ................... 296/181, 183, 296/100.12, 100.13, 100.15, 100.16, 138, 105, 104

(56) References Cited

U.S. PATENT DOCUMENTS

| | | | |
|---|---|---|---|
| 3,363,938 | * 1/1968 | Schultz | 296/65.05 |
| 4,032,186 | 6/1977 | Pickering et al. | 296/100.13 |
| 4,111,479 | 9/1978 | Rizzotto, Sr. | 135/88.16 |
| 4,172,614 | 10/1979 | Guido, Jr. | 296/100.16 |
| 4,252,363 | * 2/1981 | Rodrigue | 296/100.12 |
| 4,281,872 | 8/1981 | Biancale | 296/100.13 |
| 4,583,777 | * 4/1986 | Myburg | 296/100.12 |
| 4,700,985 | 10/1987 | Whitehead | 296/181 |
| 4,789,196 | * 12/1988 | Fields | 296/100.18 |
| 4,828,316 | * 5/1989 | Bennett et al. | 296/181 |
| 5,112,097 | 5/1992 | Turner, Jr. | 296/100.12 |
| 5,538,313 | * 7/1996 | Henning | 296/100.12 |
| 5,556,156 | * 9/1996 | Kirk | 296/100.15 |

FOREIGN PATENT DOCUMENTS

| | | |
|---|---|---|
| 2571670 | 10/1984 | (FR) . |
| 2645090 | 4/1989 | (FR) . |
| 2222118 | 2/1990 | (GB) . |

OTHER PUBLICATIONS

Video tape #1, "Stock Tarp" by Cd'A Company.
Video tape #2, "Stock Tarp" by Cd'A Company.

* cited by examiner

Primary Examiner—Stephen T. Gordon
Assistant Examiner—Patricia Engle
(74) Attorney, Agent, or Firm—Wells, St. John, Roberts, Gregory & Matkin, P.S.

(57) ABSTRACT

A flexible cover system for truck and trailer beds. The cover system includes first and second frameworks. A flexible cover is suspended between the frameworks by developing tension in the cover. Tensioning force is preferably applied to the cover using tension frames connected near the ends of the cover. Such tension can be developed using tensioning winches. A cover suspension member extends between the frameworks and can be detached at one or both ends to allow better access during loading. The cover has ribs connected to the cover at spaced locations. A framework can be collapsed or otherwise repositioned on the bed to improve access for loading and unloading. The invention also includes methods for converting the cover systems between closed and retracted conditions.

8 Claims, 10 Drawing Sheets

CONVERTIBLE LOAD COVER FOR TRUCKS AND TRAILERS

TECHNICAL FIELD

The technical field of this invention is convertible covers which are extendible and retractable to cover the load bed of vehicles, particularly trucks and road trailers used to carry freight over highways and roadways.

BACKGROUND OF THE INVENTION

The trucking industry is a large segment of the economy and is important in carrying a very large amount of freight of various types and configurations. One common type of truck and trailer is the enclosed cargo style which typically includes a surrounding enclosure which is used to cover loads and protect them from the weather. The enclosed cargo style trucks and trailers are successful in protecting the load against weather and other hazzards in most situations; however, they are not as easily loaded as flatbed style trucks and trailers. Most enclosed cargo style trucks and trailers have rear doors which are fine for small loads, but disadvantageous when loading large and long items. For example, large equipment, structural steel, reinforcing steel, long timbers and a number of other types of loads are much easier to load from the side and without any impeding side walls. Alternatively, such loads may be easily loaded using a crane or overhead hoist which brings the load down onto the truck or trailer bed.

The prior art includes a number of earlier systems which employ a tarpaulin or other flexible cover to cover truck and trailer beds. These flexible cover systems are varied in their configurations. Some are designed to be convertible between open and closed positions. This provides added convenience to the trucker with regard to opening the truck or trailer for loading, and then closing the system for highway travel. Some of these convertible cover systems use one or more cables which allows the cover to be supported and slid thereon between the open and closed positions. In some the cables are difficult or numerous to remove or do not remove to allow for more convenient loading. In others the cable systems are prone to difficulty in operation.

More traditional methods for covering loads with tarpaulins or similar covers involve simply wrapping the load with the cover and securing the cover to the vehicle bed or the load being wrapped. In some situations the loads shift during travel due to braking, acceleration, inclines, bumps or other road movements. These shifting actions can lead to damage or destruction of the tarpaulins. Weather can then reach the load, in some cases causing costly damage which often affects both the shipper and recipient with either monetary costs or lost time associated with repair or replacement of the damaged cargo.

Traditional tarpaulins and many of the convertible cover systems require substantial amounts of time to properly place and secure the covers. This is time which can more economically be spent in traveling to the next location. Thus, there is a long-standing and continuing need for a cover systems for trucks and trailers which is easy to operate and can be quickly retracted or extended. There is also need for a cover system which is effective at excluding moisture and other weather from the loads being carried by trucks and trailers.

These and other considerations have been partially or fully addressed by the current invention which is described more fully below. Additional benefits and advantages of the current invention will either be given in the following description, or will be apparent from the nature of the invention and the description given herein.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Truck and Trailer Generally

Figure 1:
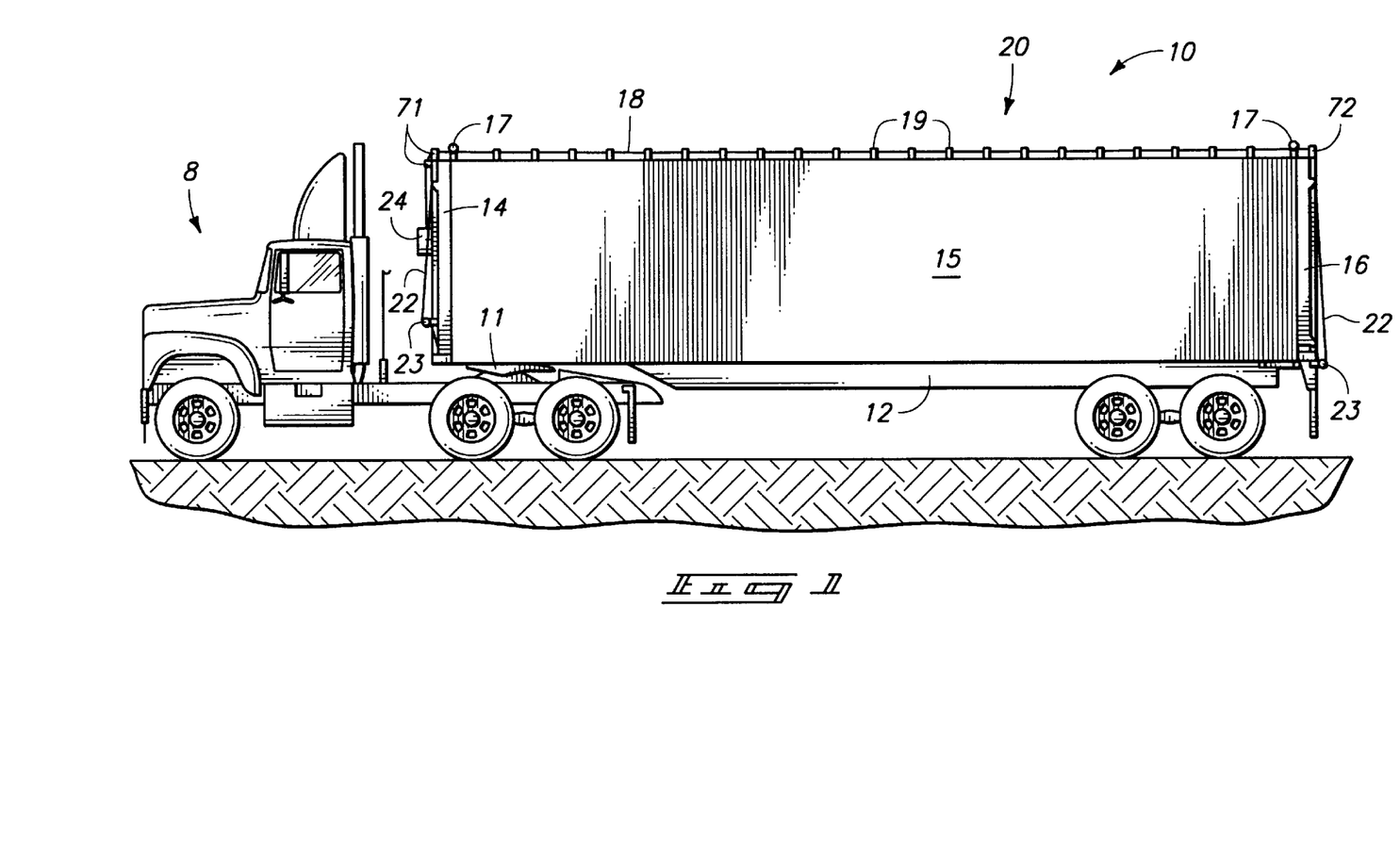
FIG. 1 is a side elevational view of a truck and trailer combination having a trailer fitted with a preferred version of the present invention.
Figure 2:
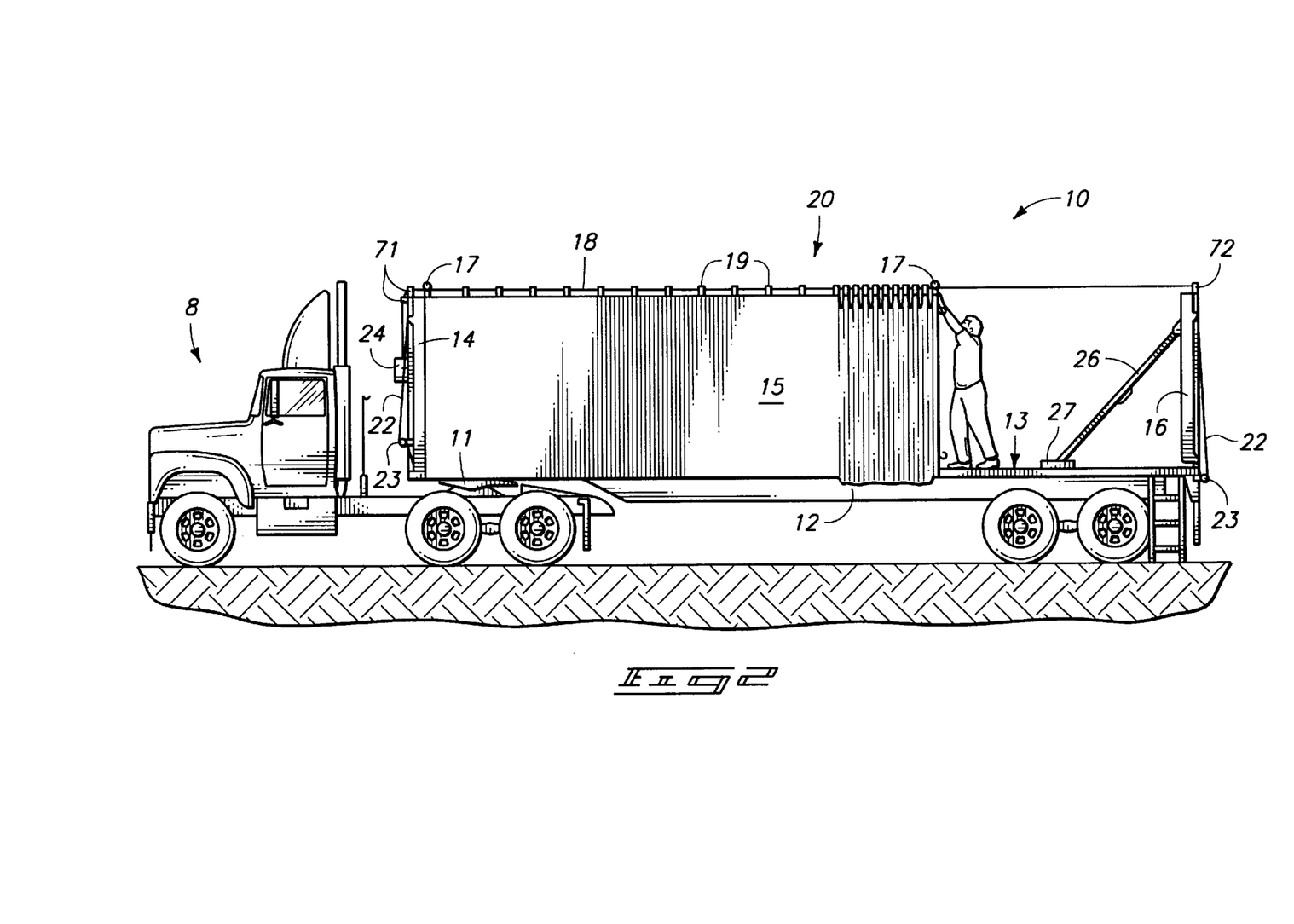
FIG. 2 is a view similar to FIG. 1 showing the cover system of the invention being retracted.

FIG. 1 shows a tractor and trailer truck combination having a tractor portion 8 and a trailer portion 10. Trailer 10 is connected to truck tractor 8 at a convention turntable hitch 11. Trailer 10 has a trailer frame 12 which is conventional. FIG. 2 shows that the trailer frame 12 supports a trailer bed 13 which is a flatbed type load carrying structure of the trailer.

FIGS. 1 and 2 both show that the trailer is provided with a first or front bulkhead framework 14 which serves to help confine loads placed upon the trailer bed against forward movement. The trailer is also provided with a second or rear framework 16. As shown, framework 16 is not in the form of a bulkhead, but can alternatively be constructed with such a bulkhead wall. The preferred construction shown for framework 16 is an open perimeter framework which has a rear opening through which people and cargo may pass, if desired. It is alternatively possible to provide the rear framework with a removable panel (not shown) which can further help to secure the cargo against weather damage or theft.

Flexible Cover System

FIG. 1 also shows trailer 10 equipped with a novel flexible cover system 20 in accordance with this invention. The various features and components of the cover system 20 will now be further described.

Cover system 20 includes a tarpaulin or flexible cover 15 which is advantageously a polyvinyl chloride sheet containing polyester reinforcing fibers. These types of tarpaulins or tarps are conventional in the trucking industry. Other types of tarps can also be used depending upon the type of service required.

The flexible cover is provided with first and second tension frames 30. These tension frames are advantageously in the form of end frames which have the front and rear end portions of the flexible cover 15 trained about the frames 30 and secured thereto, such as by heat or adhesive welding of the cover back upon marginal portions of itself.

Figure 6:
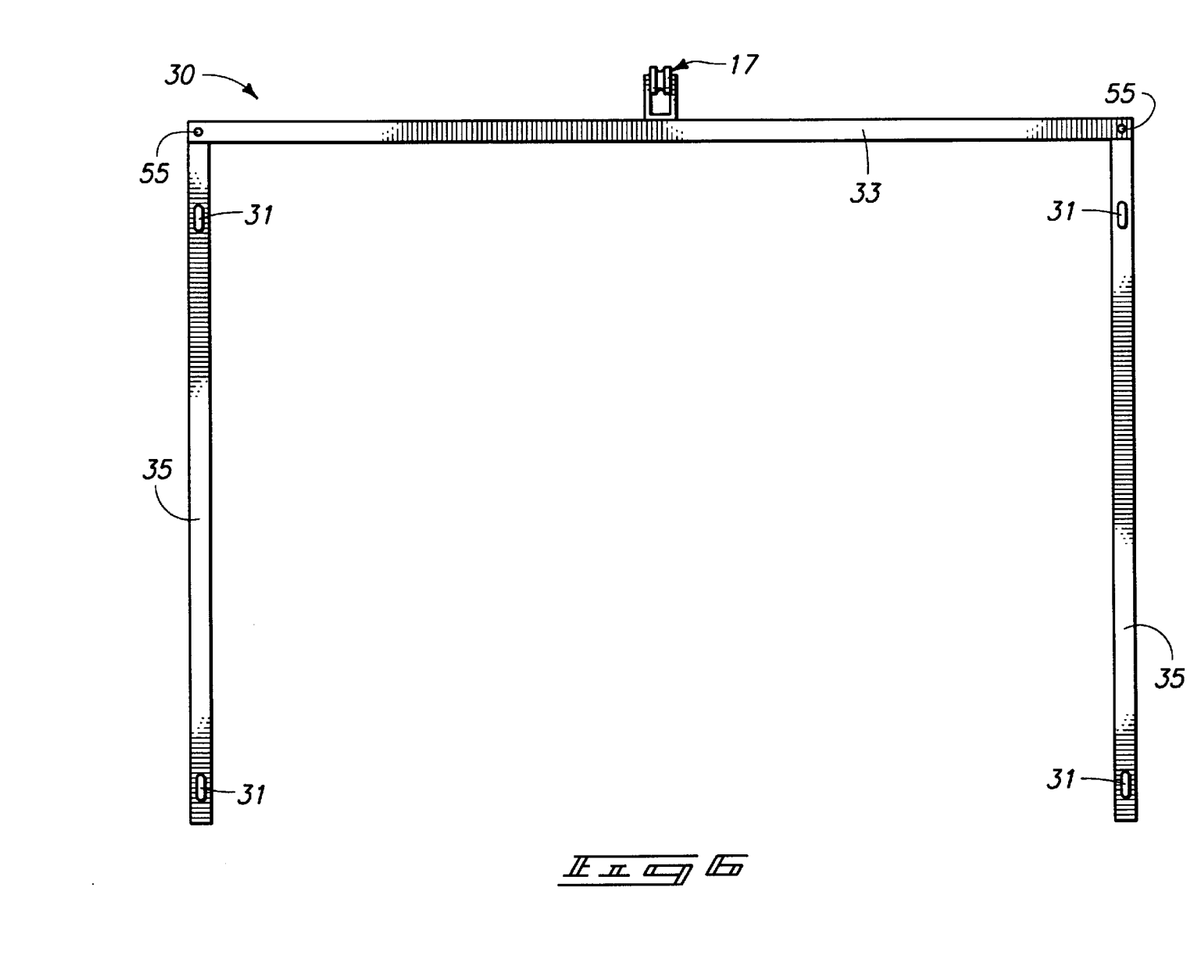
FIG. 6 is an enlarged front elevational view of a rear tension frame in isolation. The rear tension frame is part of the system of FIG. 1.
Figure 7:
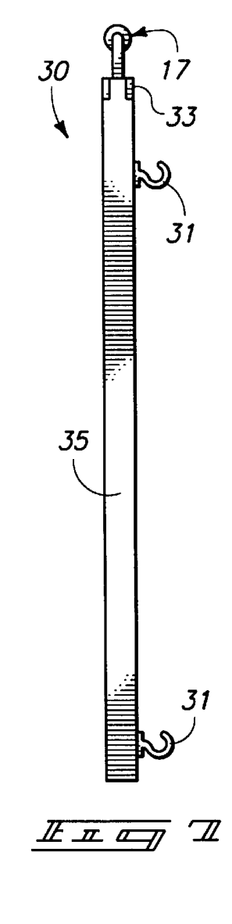
FIG. 7 is a side elevational view of the rear tension frame of FIG. 6.

FIG. 6 shows the preferred first and second end or tension frames 30 in a preferred construction. Both tension frames are the same or substantially similar to each other. Frames 30 include a central section which extends transversely across the bed of the trailer. Frames 30 also include side legs 35 which are pivotally connected to the central section 33 at pivots 55.

Tension frames 30 also have fittings 17 which are used to engage with a cover suspension member, such as cable 18. Fittings 17 are advantageously rollers which are mounted to capture cable 18 and allow the frames 30 to be repositioned along the cable by rolling the fittings along the cable. Fittings 17 can advantageously be provided with a swivel (not illustrated) which provides added mechanical flexibility when the tension frames are being moved and swing in response to the operator's arms or other moving force.

Frames 30 also advantageously include a plurality of tension connection fittings, such as in the form of hooks 31. Alternatively, the fittings 31 can be eyelets or unshaped extension (not shown).

Figure 8:
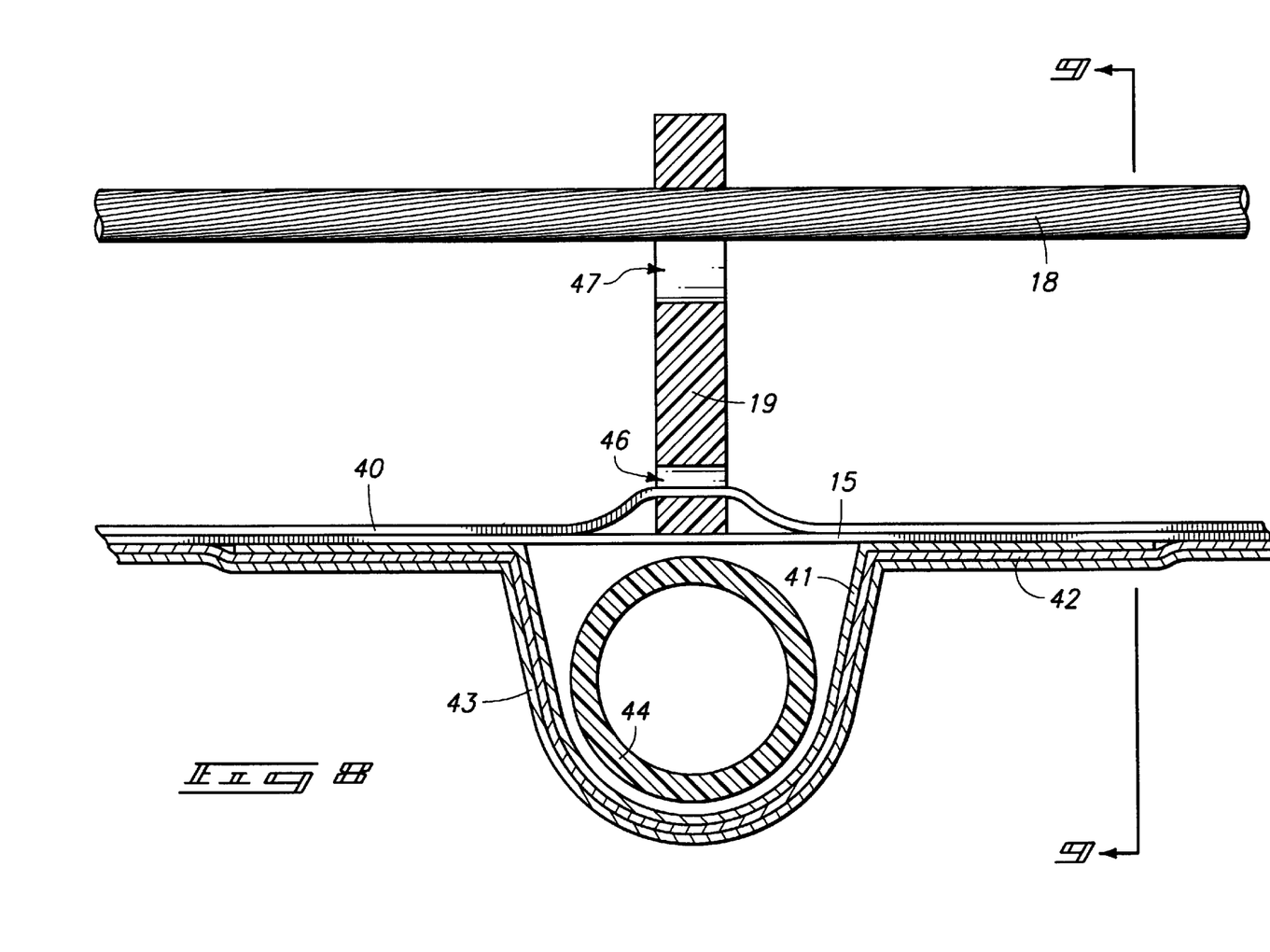
FIG. 8 is an enlarged longitudinal section view showing a preferred construction used in the system of FIG. 1 at the point of connection between the cover, cover rib and cover hanger shown supported by a cover support cable which runs longitudinally along the center top of the cover.
Figure 11:
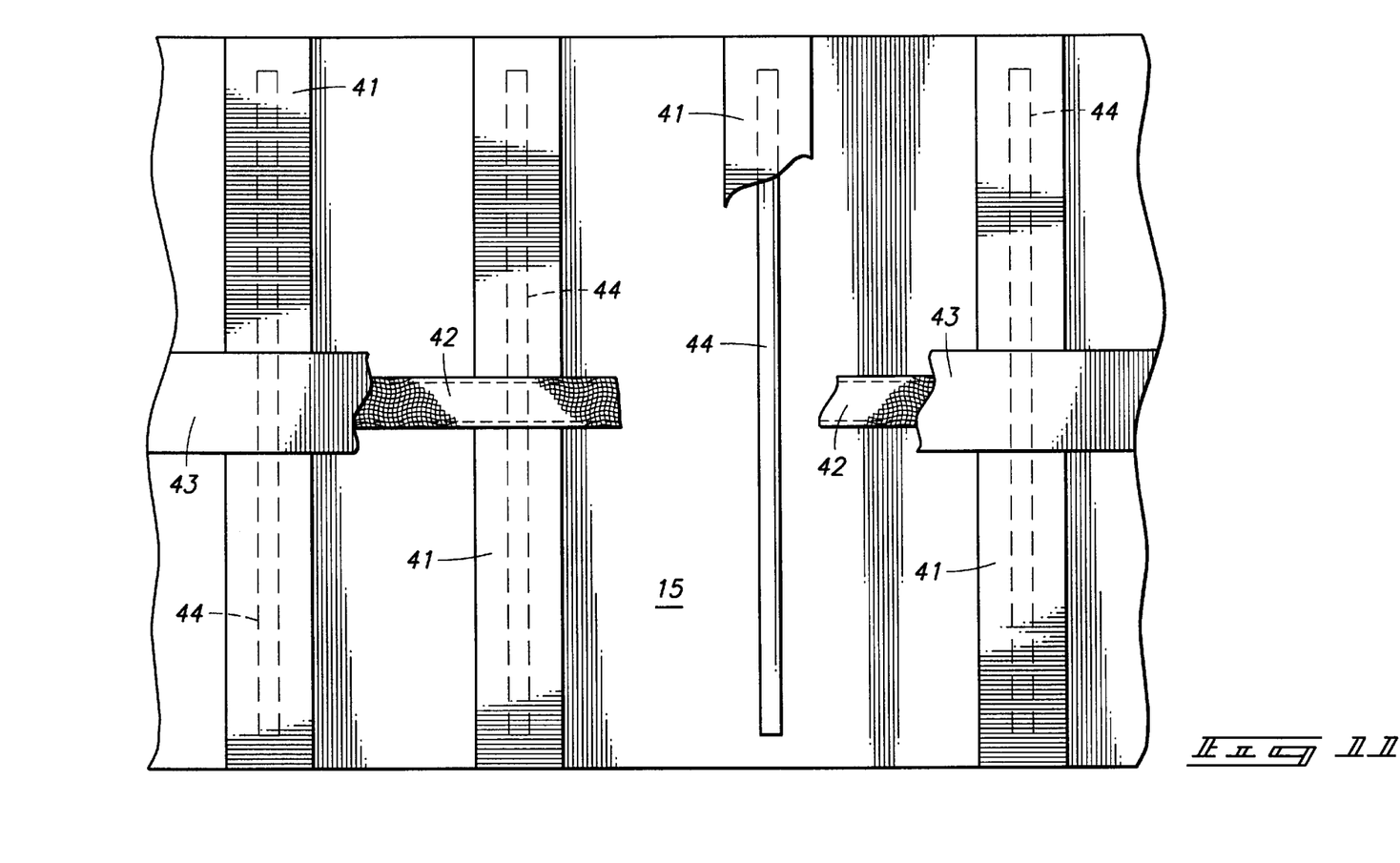
FIG. 11 is a bottom view showing a preferred construction of the cover used in the system of FIG. 1. Portions have been broken away and removed for purposes of illustration.

Flexible cover 15 also advantageously includes a plurality of transverse ribs 44 shown best in FIGS. 8 and 11. Ribs 44 can advantageously be made of polyvinyl chloride pipe of conventional manufacture. The ribs 44 are slightly less in length than the widths of the cover and bed of the trailer. The ribs are advantageously mounted within a rib mounting pocket formed by a rib panel piece 41 which is adhered, or more preferably, heat welded to the underside of the flexible cover 15. FIG. 8 shows in sectional presentation that the rib mounting pocket is formed between cover 15 and panel 41.

FIG. 11 shows that the preferred rib mounting construction employs a longitudinal strap 42 which is advantageously a relatively strong strap, such as a woven nylon strap. Strap 42 is preferably sewn to the underside of the top panel of the cover, as indicated in FIG. 11. Strap 42 extends beneath the pocket panel 41 and longitudinally along the length of the cover, such as along a medial or central longitudinal axis of the trailer.

The top or upper surface of cover 15 is also advantageously provided with a top strap 40, best shown in FIG. 8. Top strap 40 is also sewn to the cover 15 by the same or a different sewing operation as bottom strap 42. Alternative constructions, such as adhesive or heat welding, may be possible but are not considered as strong as sewing.

The top cover panel is rendered waterproof despite the stitching used to secure the straps to the cover. This is advantageously done by adhesively, or otherwise sealingly attaching a sealing strap 43 along the underside of the cover.

Figure 9:
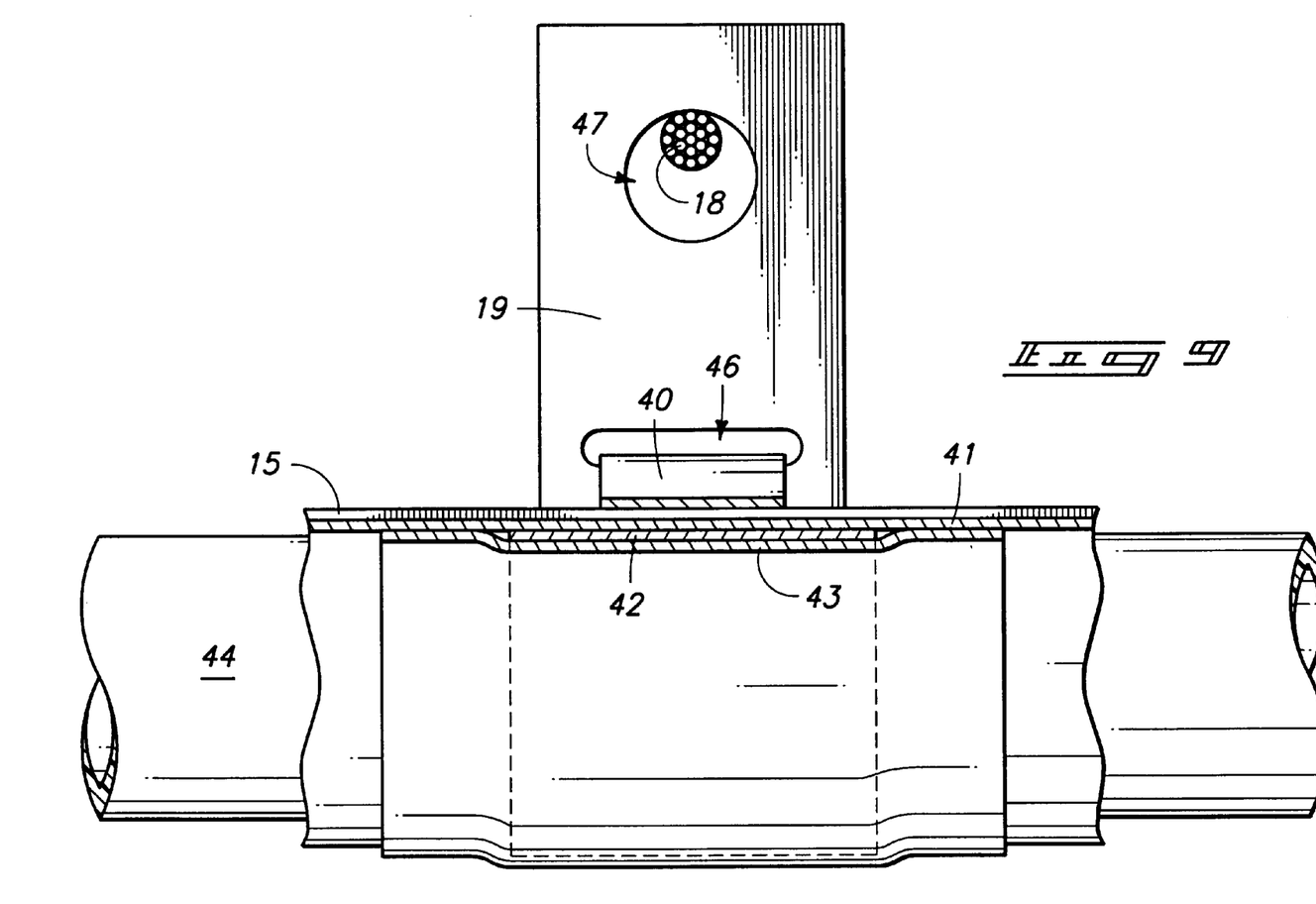
FIG. 9 is a front elevational view, with portions shown partially removed and in sectional presentation to better detail the construction of the connection shown in FIG. 8.

The top strap 40 is used to support the cover by providing interrupt segments where the top strap 40 passes through a cover support or suspension hanger 19. This hanger can be made from ultra-high molecular weight polymer materials widely used in industry for a variety of parts. FIG. 9 shows that the hanger is advantageously provided with a hanger connection aperture 46 which receives the top strap 40 therethrough.

Figure 3:
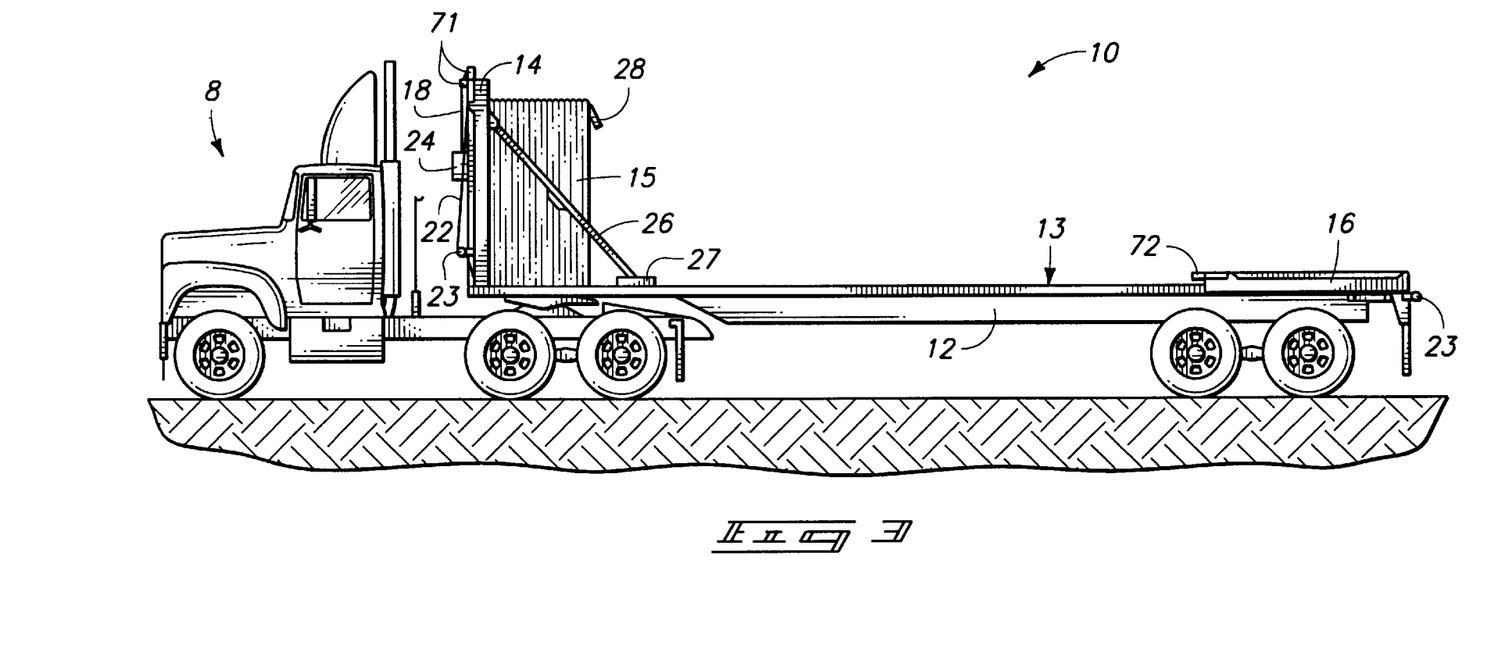
FIG. 3 is a view similar to FIGS. 1 and 2 showing the cover system fully retracted and the rear framework forming a part thereof in a collapsed position.
Figure 4:
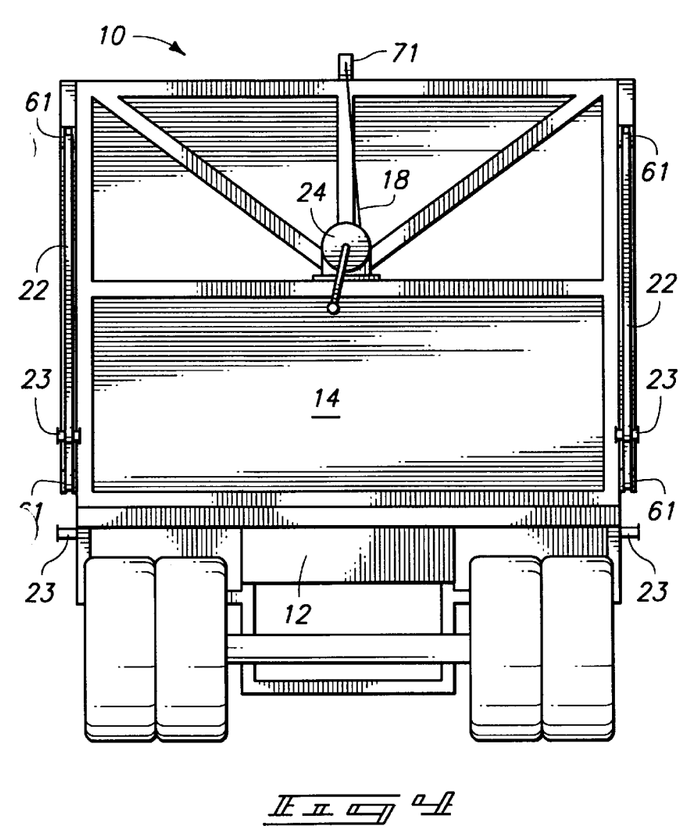
FIG. 4 is a front elevational view of the trailer forming part of FIG. 1.

Hanger 19 also is preferably provided with a cable or suspension aperture 47 through which cable 18 or other suspension member is trained. Cable 18 and aperture 47 are provided with clearance so that the hangers can be easily slid along the cable to extend and retract the cover. FIG. 1 shows the cover extended. FIG. 2 shows the cover partially retracted. FIG. 3 shows the cover fully retracted.

Figure 5:
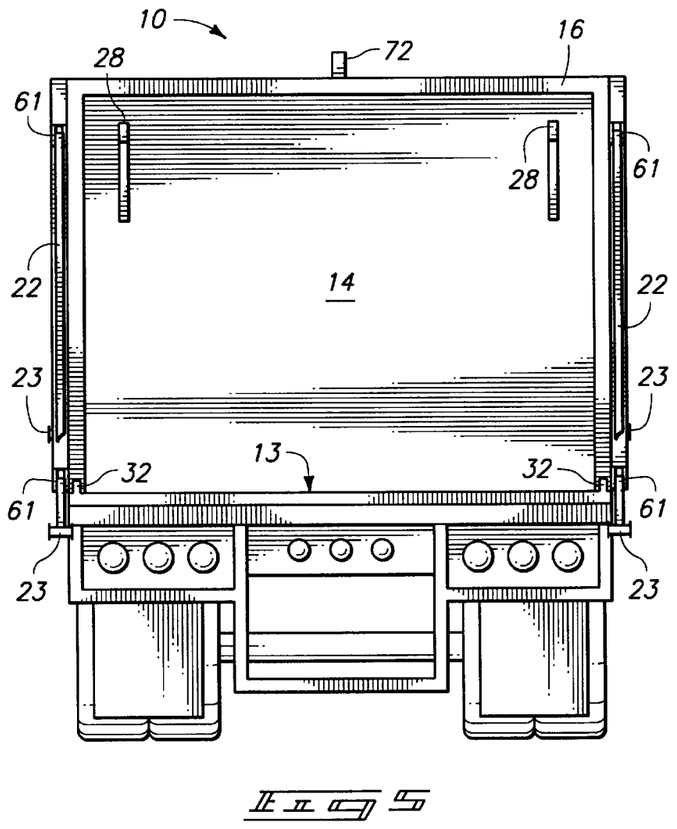
FIG. 5 is a rear elevational view of the trailer forming part of FIG. 1.

FIGS. 3 and 5 show that the cover is advantageously supported in the retracted condition by a cover support bracket or brackets 28 which are in this embodiment mounted to the front bulkhead. Alternatively, the brackets or other supports can be mounted to other parts of the framework.

Figure 10:
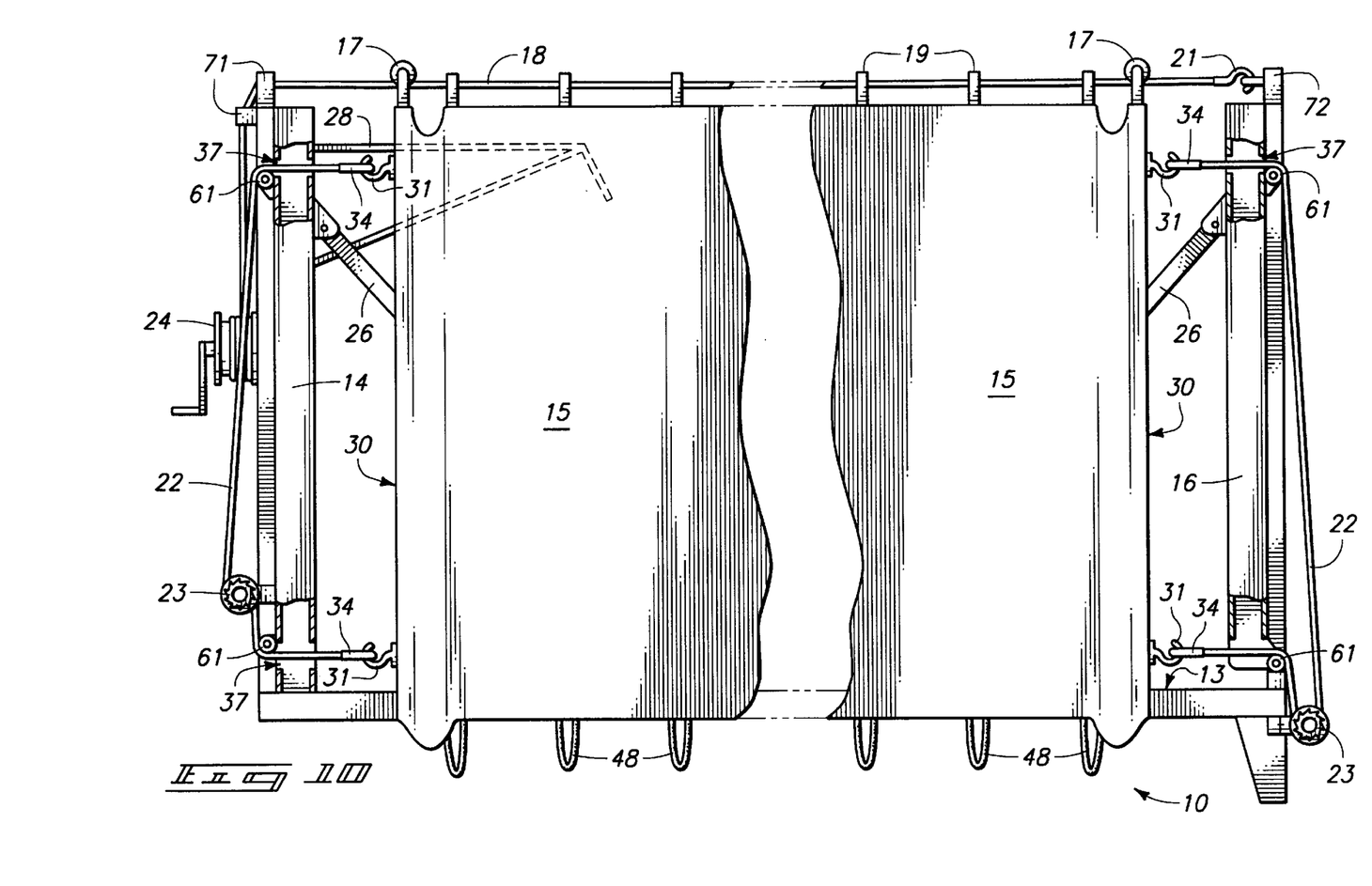
FIG. 10 is an enlarged side elevational view showing a number of mechanical features of the preferred cover system of FIG. 1.

The tension frames 30 are forced toward the front and rear frameworks 14 and 16 using a tension force application means. This is preferably accomplished using conventional strap winches 23 which receive one or more nylon or other relatively strong woven straps 22. The straps 22 are connected to the fittings 31 at strap end fittings 34. Fittings 31 are on the tension frames 30. As shown there are a plurality or two connection fittings at each side of each tension frame. It is also possible to have only one such fitting or to have additional fittings. The straps 22 are trained over rollers 61 to align the direction of tension-developing force in a longitudinal direction relative to the trailer.

The cable 18 or other suspension member is made detachable from one or both ends at the suspension member connections 71 and 72 with the front and rear, or first and second, frameworks 14 and 16. A suspension cable operator, in the form of a conventional manual winch 24 is used to tighten and loosen the cable 18. Cable 18 has a detachable end fitting 21 which allows easy detachment from the rear framework so that the cable can be removed forward during loading and unloading of the trailer bed 13.

The front and rear frameworks 14 and 16 can advantageously be provided with suitable features to allow the frameworks to be moved into multiple positions to reduce any adverse effects upon loading and unloading of the trailer. This can be done by mounting the frameworks 14 and 16 to the bed using pivotal joints 32 (see FIG. 5). Pivotal joints 32 allow the frameworks to be pivoted downwardly into a contracted condition after removing or displacing the stabilizing braces 26. FIG. 3 shows the rear or second framework collapsed into the contracted position.

Figures 12, 13:
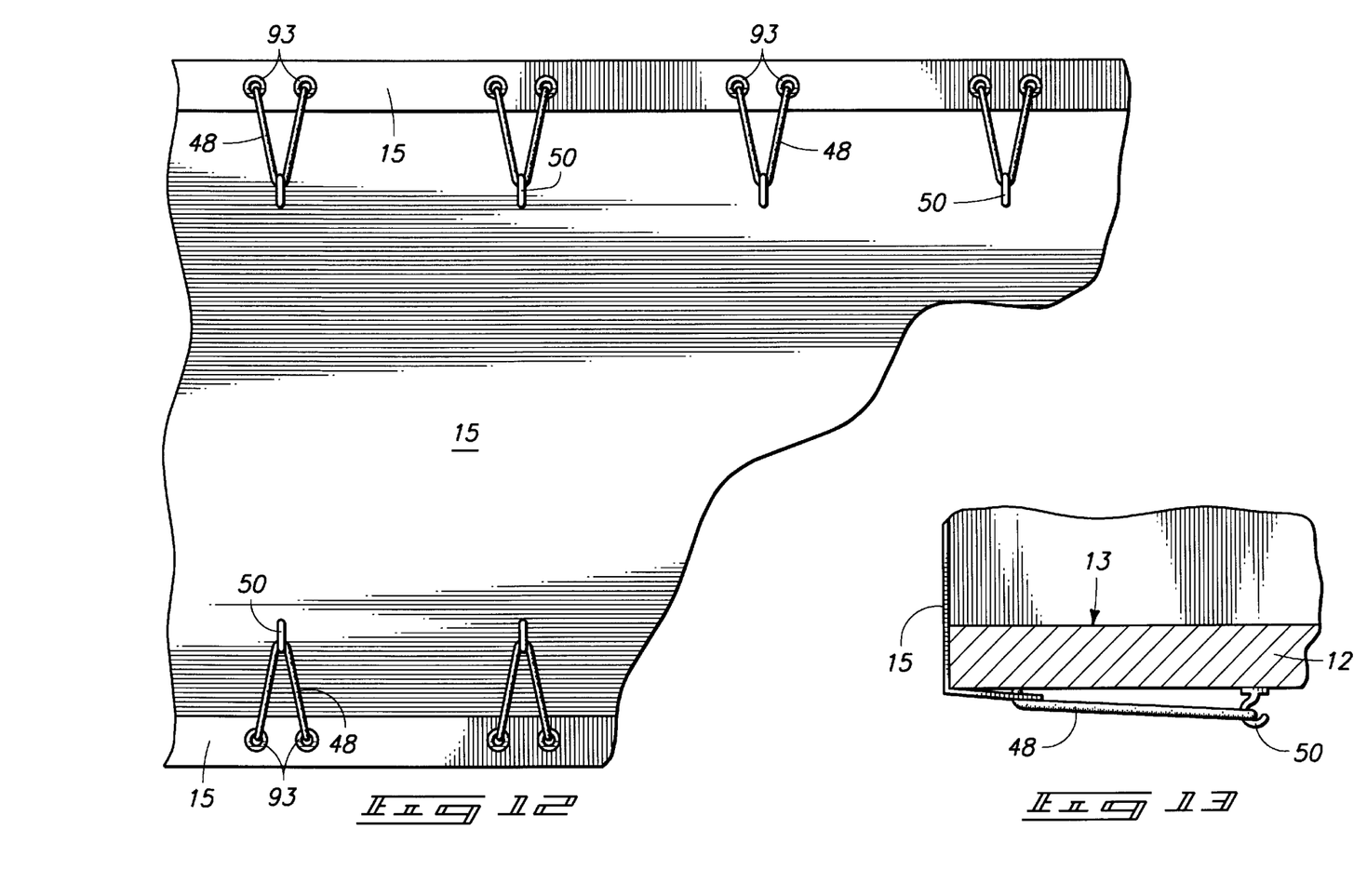
FIG. 12 is a bottom view of portions of the trailer of FIG. 1 showing a preferred lower cover securement construction used in the system of FIG. 1.
FIG. 13 is a partial sectional view further detailing the construction of FIG. 12.

FIGS. 12 and 13 detail a preferred construction for securing the lower reaches of the cover to the bed or frame of the trailer. As shown, the detachable cover connectors 48 are in the form of resilient rubber ropes or bands which extend through grommets 93 mounted along the lower edges if the cover 15. The connectors 48 can be stretched and placed about bed mounting hooks 50 or other suitable fittings. The use of these resilient restraints near the bottom of the cover side walls reduces wear and tear on the cover during highway travel.

Methods

The invention also includes novel methods for covering and uncovering cargo or loads supported upon a truck or trailer bed. The methods for covering a load can be defined to include loading the load or cargo upon the bed 13. The methods can also include positioning a first cover tension frame relative to a first framework. This can be done using suitable means, such as the winches 23 or other fittings or fasteners.

The methods can further include moving a second cover tension frame relative to a second framework to provide tensioning of the flexible cover so as to achieve a desired tension in the flexible cover between the first and second cover tension frames.

The methods can further include securing or attaching lower reaches of the flexible cover to the bed at a plurality of positions, such as at resilient members 48 to fitting 50 of the trailer.

The methods can further include expanding or moving one or both of the frameworks 14 and 16 from a contracted condition, such as shown in the rear of FIG. 3, to an expanded condition, such as shown in FIG. 2. This can be accomplished by bracing the framework, such as by using the brace members 26 which can be detachably mounted to trailer bed 13 at brace fittings 27. FIGS. 3 and 2 show that the rear framework 16 is also expanded by pivoting the framework about the pivot connections 32 into the upright condition and then securing the framework into the braced upright condition. Similar action can be performed to the front framework if desired in particular circumstances.

The invention further includes novel methods for uncovering a flexible cover from over a load positioned upon a bed of a truck or trailer. The novel methods preferably include detaching lower reaches of the flexible cover from the bed, such as by detaching the resilient members 48 from the trailer bed fittings 50. This can be done by stretching or deforming the members 48 and passing the loops free of the hooked fittings or other type of fittings.

The methods can further be defined to include moving a cover tension frame relative to a framework to release tension existing in the flexible cover as tensioned between first and second tension frames. Thereafter the operator performs by retracting the flexible cover by moving the cover along the suspension member, such as cable 18. This can be done by rolling fitting 17 along the cable or other supporting member.

The methods can also include contracting at least one framework, such as frameworks 14 or 16 into a contracted condition, such as shown in FIG. 3, from the expanded condition shown in FIG. 2. This can be done by detaching one or both ends of the brace member 26 and then pivoting the frame into the contracted condition.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A cover system for a bed of a truck or trailer which is convertible between a covered condition wherein a load supported upon the bed is covered to prevent or reduce weather or other damage to the load, and a retracted condition wherein the bed of the truck or trailer is open along substantial portions of its length to allow convenient loading and unloading, comprising:
   a first framework connected to the bed, said first framework being positioned at a first framework position along the bed;
   a second framework connected to the bed, said second framework being positioned at a second framework position along the bed which is spaced from the first framework position;
   a flexible cover for covering the bed approximately between the first framework and the second framework;
   a first cover tension frame connected to the flexible cover at a first tension frame connection;
   a second cover tension frame connected to the flexible cover at a second tension frame connection;
   at least one cover tensioner for tensioning the flexible cover to help support the flexible cover between the first and second frameworks;
   a cover system wherein the at least one cover tensioner includes port and starboard tensioning winches which adjustably tension port and starboard sides of the cover.

2. A cover system according to claim 1 wherein the port and starboard tensioning winches are strap tensioning winches that receive at least one strap to adjustably tension port and starboard sides of the flexible cover.

3. A cover system for a bed of a truck or trailer which is convertible between a covered condition wherein a load supported upon the bed is covered to prevent or reduce weather or other damage to the load, and a retracted condition wherein the bed of the truck or trailer is open along substantial portions of its length to allow convenient loading and unloading, comprising:
   a first framework connected to the bed, said first framework being positioned at a first framework position along the bed;
   a second framework connected to the bed, said second framework being positioned at a second framework position along the bed which is spaced from the first framework position;
   a flexible cover for covering the bed approximately between the first framework and the second framework:
   a first cover tension frame connected to the flexible cover at a first tension frame connection;
   a second cover tension frame connected to the flexible cover at a second tension frame connection;
   at least one cover tensioner for tensioning the flexible cover to help support the flexible cover between the first and second frameworks;
   at least one cover suspension member which can be selectively extended along the bed to help support the cover.

4. A cover system according to claim 3, and further comprising:
   a plurality of rib connection hangers connected to the flexible cover, said rib connection hangers being slidably mounted upon the at least one cover suspension member.

5. A cover system according to claim 3, wherein said at least one cover suspension member is flexible and detachable relative to at least one of the frameworks so that the cover suspension member can be selectively extended along the bed to help support the cover during extension or retraction, and detached to allow more complete access to place or remove a load onto or from the bed.

6. A cover system for a bed of a truck or trailer which is convertible between a covered condition wherein a load supported upon the bed is covered to prevent or reduce weather or other damage to the load, and a retracted condition wherein the bed of the truck or trailer is open along substantial portions of its length to allow convenient loading and unloading, comprising:

- a first framework connected to the bed, said first framework being positioned at a first framework position along the bed;
- a second framework connected to the bed, said second framework being positioned at a second framework position along the bed which is spaced from the first framework position;
- a flexible cover for covering the bed approximately between the first framework and the second framework;
- a first cover tension frame connected to the flexible cover at a first tension frame connection;
- a second cover tension frame connected to the flexible cover at a second tension frame connection;
- at least one cover tensioner for tensioning the flexible cover to help support the flexible cover between the first and second frameworks;
- wherein said first and second cover tension frames have at least one outer leg which is pivotally connected to a main frame section.

7. A cover system according to claim 6, wherein:

said first and second tension frames are U-shaped;

said first and second cover tension frames have plural outer legs which are pivotally connected to a main frame section.

8. A cover system for a bed of a truck or trailer which is convertible between a covered condition wherein a load supported upon the bed is covered to prevent or reduce weather or other damage to the load, and a retracted condition wherein the bed of the truck or trailer is open along substantial portions of its length to allow convenient loading and unloading, comprising:

- a first framework connected to the bed, said first framework being positioned at a first framework position along the bed;
- a second framework connected to the bed, said second framework being positioned at a second framework position along the bed which is spaced from the first framework position;
- a flexible cover for covering the bed approximately between the first framework and the second framework;
- a first cover tension frame connected to the flexible cover at a first tension frame connection;
- a second cover tension frame connected to the flexible cover at a second tension frame connection;
- at least one cover tensioner for tensioning the flexible cover to help support the flexible cover between the first and second frameworks;
- wherein at least one of the frameworks includes:
    - at least one brace which is detachably mounted to portions of the bed to allow disconnection of at least portions of the frameworks during loading or unloading;
    - at least one pivot connection between the at least one of the frameworks which allows the framework to pivot into a collapsed position upon the bed.

* * * * *

UNITED STATES PATENT AND TRADEMARK OFFICE
CERTIFICATE OF CORRECTION

PATENT NO. : 6,183,036 B1
DATED : February 6, 2001
INVENTOR(S) : David A. Coulson It is certified that error appears in the above-identified patent and that said Letters Patent is hereby corrected as shown below:

Column 3,
Line 43, after "eyelets or", delete [unshaped] and replace with -- u-shaped --.

Signed and Sealed this

Twenty-fifth Day of September, 2001

Attest:

NICHOLAS P. GODICI
Attesting Officer
Acting Director of the United States Patent and Trademark Office